United States Patent
Becherucci et al.

(10) Patent No.: US 7,774,924 B2
(45) Date of Patent: Aug. 17, 2010

(54) METHOD OF WINDING A DYNAMO-ELECTRIC MACHINE COMPONENT

(75) Inventors: Raffaele Becherucci, Florence (IT); Massimo Pelletta, Viguzzolo (IT); Rodolfo Pes, Turin (IT); Gianfranco Stratico, Siena (IT)

(73) Assignee: ATOP, S.p.A., Florence (IT)

( * ) Notice: Subject to any disclaimer, the term of this patent is extended or adjusted under 35 U.S.C. 154(b) by 275 days.

(21) Appl. No.: 12/080,261

(22) Filed: Mar. 31, 2008

(65) Prior Publication Data
US 2009/0064483 A1 Mar. 12, 2009

Related U.S. Application Data

(63) Continuation of application No. 11/077,553, filed on Mar. 10, 2005, now Pat. No. 7,367,106, which is a continuation of application No. 10/434,892, filed on May 8, 2003, now abandoned.

(60) Provisional application No. 60/396,406, filed on Jul. 15, 2002, provisional application No. 60/380,893, filed on May 14, 2002.

(51) Int. Cl.
*H01F 7/06* (2006.01)
(52) U.S. Cl. .............. 29/606; 29/598; 29/605; 242/361.1; 242/362.2; 242/363; 310/201; 310/215
(58) Field of Classification Search .......... 29/606, 29/597, 598, 605; 242/361.1, 362.1, 363; 310/201, 207, 215
See application file for complete search history.

(56) References Cited

U.S. PATENT DOCUMENTS

| | | | |
|---|---|---|---|
| 3,192,961 A | 7/1965 | Moore | |
| 3,628,575 A | 12/1971 | Hill | |
| 3,702,498 A | 11/1972 | Mason | |
| 4,312,387 A | 1/1982 | Finegold et al. | |
| 4,908,541 A | 3/1990 | Kawazoe et al. | |
| 5,657,530 A | 8/1997 | Kawamura et al. | |
| 5,859,486 A | 1/1999 | Nakahara et al. | |
| 5,986,377 A * | 11/1999 | Yamada et al. | 310/216.013 |
| 6,659,385 B2 * | 12/2003 | Akita et al. | 242/432.6 |
| 6,715,199 B2 | 4/2004 | Kusumoto et al. | |
| 6,746,490 B2 | 6/2004 | Kimura et al. | |

FOREIGN PATENT DOCUMENTS

| | | |
|---|---|---|
| DE | 100 31 621 | 8/2001 |
| EP | 0 871 282 | 10/1998 |
| EP | 1 168 570 | 1/2002 |
| EP | 1 191 672 | 3/2002 |
| JP | 57-208848 | 3/1983 |
| JP | 60-216747 | 3/1986 |

* cited by examiner

*Primary Examiner*—Thiem Phan
(74) *Attorney, Agent, or Firm*—Ropes & Gray LLP

(57) ABSTRACT

Stator designs have wide-mouth slots between adjacent poles. Wire coils with high slot fill conductivity are formed around the poles. In some designs, the wire coils are wave wound around the poles. Thick bar conductors can be used for making the wire coils. The wire coils may be inserted using nozzle dispensers or transferred from a pre-form mandrel. In other designs, the wire coils are pre-formed on transferable pockets that are then mounted on the poles. Optional pole extensions or shoes can be attached to the stator poles after the wire coils are formed around the poles.

7 Claims, 10 Drawing Sheets

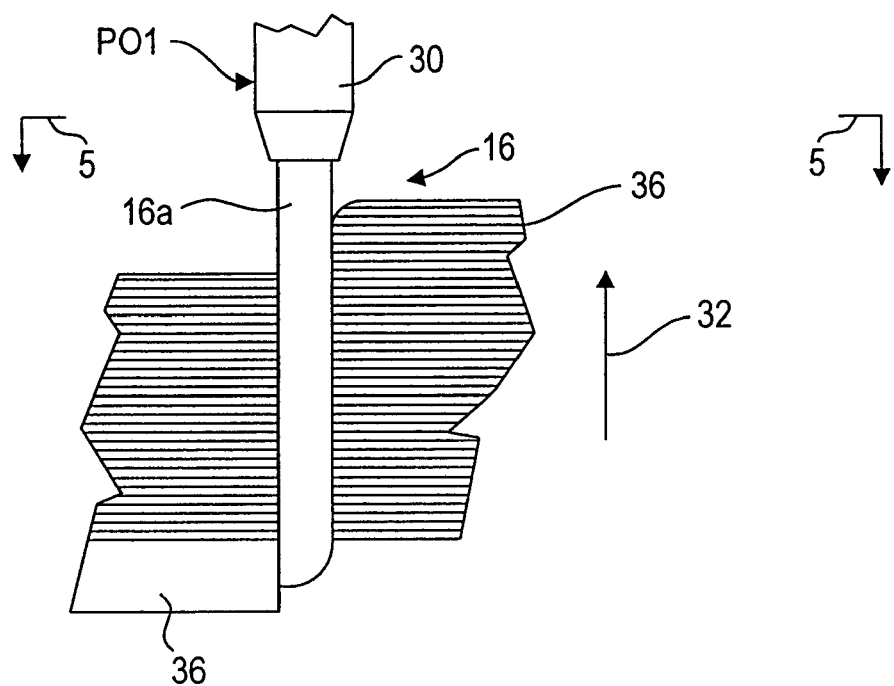
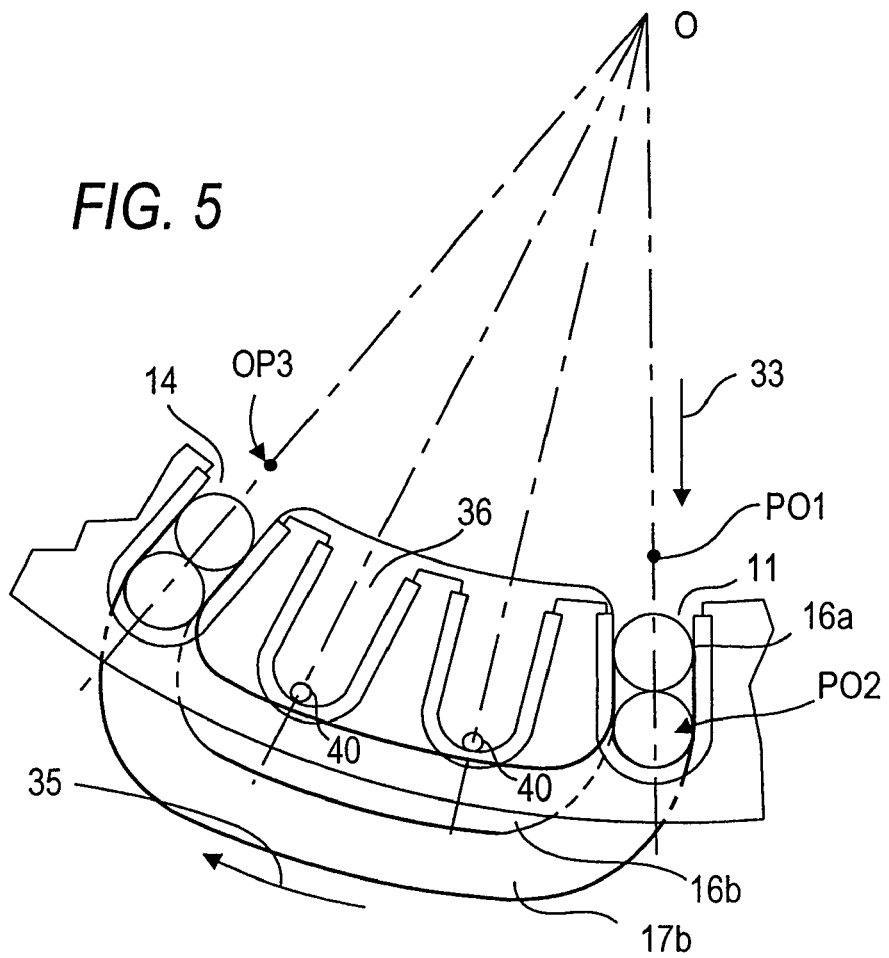

METHOD OF WINDING A DYNAMO-ELECTRIC MACHINE COMPONENT

This application is a continuation of U.S. application Ser. No. 11/077,553, filed Mar. 10, 2005, which is a continuation of U.S. application Ser. No. 10/434,892, filed May 8, 2003, which claims the benefit of U.S. provisional application No. 60/380,893, filed May 14, 2002 and U.S. provisional application No. 60/396,406, filed Jul. 15, 2002. These prior applications are hereby incorporated by reference herein in their entireties.

BACKGROUND OF THE INVENTION

The present invention relates to improved wire coil designs for dynamo-electric machine components (e.g., stators for electric motors, generators, or alternators) and to manufacturing solutions for implementing such designs.

Dynamo-electric machines operate by exploiting the interaction of rotating magnetic fields with a magnetic part or rotor. For example, ac electric motors include armatures or a configuration of insulated wire coils in a stationary part or stator. Current flow through the wire coils generates magnetic fields in the space of the stator. The wire coils are wound around ferromagnetic cores or poles to enhance the strength of the generated magnetic field. Stator casings are often made from ferromagnetic laminates. Longitudinal slots in the stator casings usually define these poles. The poles generally are tooth-like cross sections that are rectangular or trapezoidal, but are invariably provided with cap-like lateral extensions or shoes at their top ends to enhance the concentration or passage of magnetic flux.

Flowing current of different phases through a progressive sequence of coils around the stator rotates the magnetic field generated in the stator. This rotating magnetic field imparts electromechanical torque to the rotor and turns the electrical motor shaft on which the rotor is mounted.

The operational characteristics of a dynamo-electric machine depend on the nature or properties of the generated magnetic field. These properties are determined by the particular structure or design of the slots, poles, and the wire coils used. Design features such as the shape of the slots (e.g., depth, widths, and curvatures) and the winding specifications (e.g., wire size, turns, and slot fill ratio), affect not only the performance and efficiency of the dynamo-electric machine, but are also relevant to dynamo-electric machine manufacturing costs and reliability.

Consideration is now being given generally to ways of providing solutions for improving uniformity and reproducibility in dynamo-electric machine component manufacture. Attention is directed to slot and pole shapes, and winding coil structures or designs, with a view to improve the performance of dynamo-electric machines, and to improve manufacturing costs and reliability.

SUMMARY OF THE INVENTION

In accordance with the principles of the invention, dynamo-electric machine components are designed for high slot fill conductivity. Conventional cap-like pole extensions are avoided, or optionally are installed after the wire coils are placed or inserted in the slots. The wide mouth-slot designs provide unhindered access to the interior portions of the slot. All regions or volumes of the slots are accessible for insertion or placement of wire coil turns. Thus greater slot fill conductivity can be achieved.

The inventive wide-mouth slot design may, for example, be used to make compact, high current capacity poly-phase stators for automotive alternator applications.

Wire coils corresponding to each of the current phases may, for example, be wave wound around the stator poles. Conventional wire sizes may be used for the wire turns of the wire coils. Optionally, thick bar conductors can be used for making a wire coil with a designed current-carrying capacity with fewer turns than is possible with smaller size wire.

The wire coils can be formed using a nozzle to dispense stretches of wire conductors. The stator and the nozzle are moved relative to each other to place conductor lengths generally along the path or shape of the desired wire coil. Conductor lengths placed along the slot passages are then pulled or snapped into the slots by relative radial motion of the nozzle to insert the wire coil around the poles.

Alternatively, the wire coil conductors may first be pre-formed or shaped on a co-axial mandrel. The mandrel can have seats to hold a pre-formed wire coil. The mandrel seats can be aligned with the stator passages. Radial push or presser mechanisms built, for example, into the mandrel seats may be used to push transfer and press the pre-formed wire coil from the mandrel into the stator slots.

In some stator applications, parallel coil configurations (in which individual coils are wound around individual poles) are desirable. The individual wire coils may be installed as pre-formed wire coils. The pre-formed wire coils may be made wound on (insulating material) pockets, and then transferred to surround the poles. In some cases, the pocket carrying a pre-formed wire coil itself may be moved or transferred to surround a pole.

In an assembly line coil-winding workstation, a mandrel supports moveable pockets on a number of radial extensions. Flyer arms or other winding tools are used to pre-form wire coils in the supported pockets. The stator poles are then aligned with the radial mandrel extensions. Pockets holding the pre-formed wire coils on the radial mandrel extensions are then transferred on to the stator poles.

One or more workstations may be used to concurrently process fractions of the number of wire coils required for a stator. Accordingly, the number of pockets/radial extensions on the mandrel in each of the workstations corresponds to a fraction of the total number of the poles. Processing a limited number of wire coils at a workstation may accommodate the workspace or clearance requirements of common winding tools (e.g., flyer arms) in otherwise tight stator geometries or configurations. In a convenient arrangement, each workstation is used to process wire-coils for the poles associated with a specific current phase. Thus, for a three-phase stator, three workstations are used.

Insulating covers may optionally be installed over the slot passages to mechanically retain the coil conductors in position. Similarly, optional ferromagnetic pole extensions designed to enhance passage of magnetic flux through the poles can be installed after the wire coil has been inserted.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 4 is a view taken from direction 4-4 of FIG. 3, illustrating the use of a wire delivery nozzle to insert conductors into the stator slots, in accordance with the principles of this invention;

FIG. 5 is a view taken from direction 5-5 of FIG. 4, schematically illustrating the relative radial motion of the wire delivery nozzle while inserting longitudinal conductor portions of the wire conductors in the stator slots, and other motion while depositing conductor segments or lengths on an axial face of the stator, in accordance with the principles of this invention;

FIGS. 6 and 7 show an enlarged view of a slot of FIG. 3 with the slot coverings in place over the slot;

FIG. 8 is taken from direction 8 of FIG. 7;

FIG. 9 shows portions of this slot cover assembly placed over three of the slots of FIG. 3.

FIG. 10 is a view taken from direction 10-10 of FIG. 9;

FIG. 12 additionally shows a stator aligned with the mandrel and shows the pockets with the pre-formed wire coils being moved onto the stator poles, in accordance with the principles of this invention;

Figure 1:
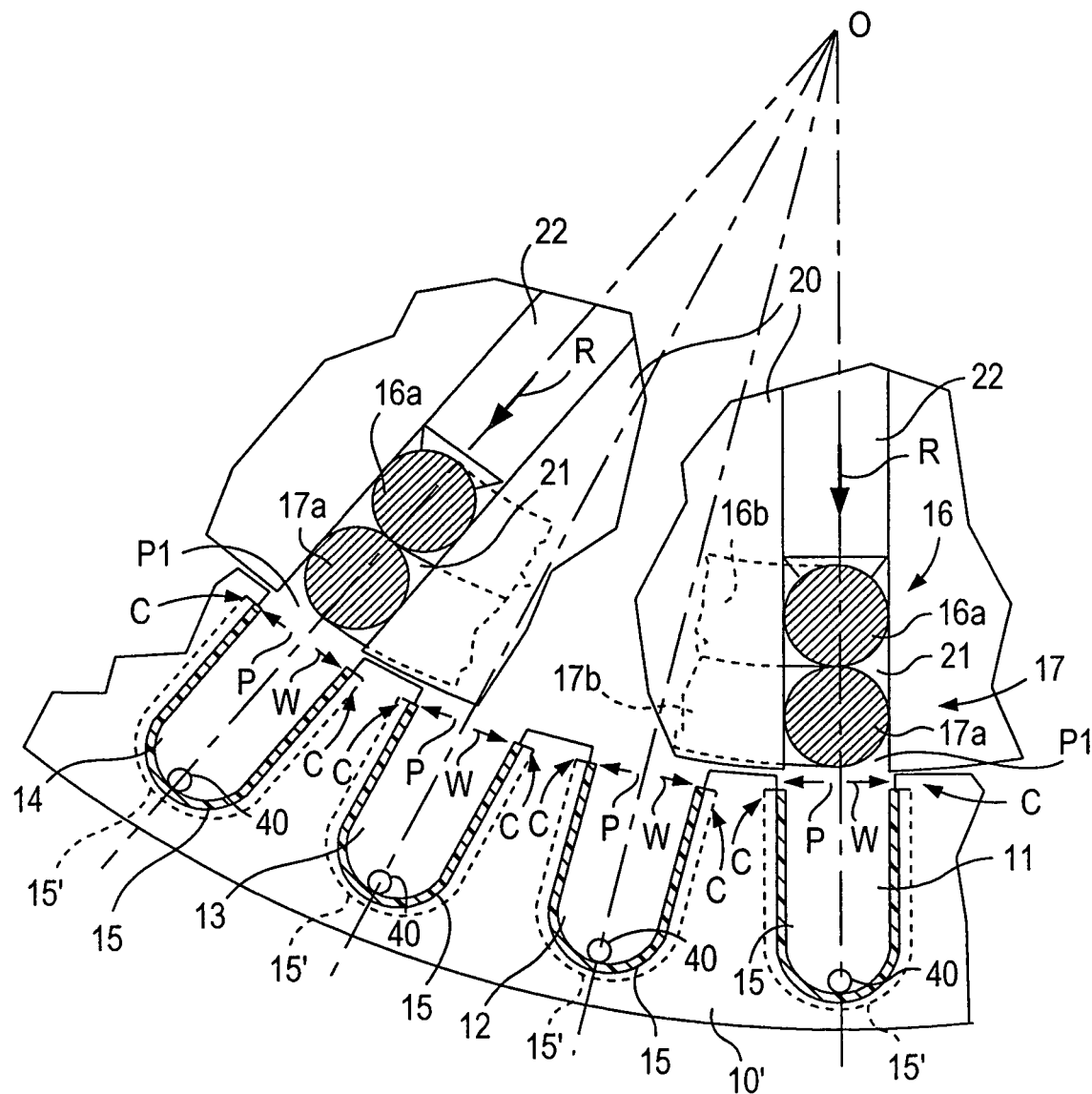
FIG. 1 is a partial plan view of an exemplary three-phase stator during the formation of wave wound conductor coils according to the principles of this invention.

In several of the accompanying drawings, which show sectional views, hatching or shading of various sectional elements have been omitted for clarity. It will be understood that this omission of hatching or shading in the drawings is for the purpose of clarity in illustration only.

DETAILED DESCRIPTION OF THE INVENTION

In order that the invention herein described can be fully understood, the subsequent description is set forth in the context of the manufacture of polyphase, multiple-pole stators.

An inventive stator design is described herein with reference to stator 10 shown in FIG. 1. The casing of stator 10 may, for example, be assembled by conventional methods from shaped ferromagnetic laminates. Lamination slots (e.g., slots 11, 12, 13, 14) running along the inner surface of the casing define the stator poles around which wire coils are formed.

Stator 10 may have the phase and pole/slot configurations that are commonly used in stators for automobile alternator applications. For example, stator 10 may have a three-phase, 36 slot configuration.

In a common automobile alternator, each of the thirty-six stator slots is associated with a specific current phase. Adjacent slots are associated with the respectively adjacent current phases. This association progressively repeats itself in sequence around the stator (as the number of slots exceeds the number of different current phases). Thus, three intercalated sequences of slots are associated with the first, second and third current phases. Each sequence is 12 slots long and has a pitch or interval of three slots. For example, the sequence (1, 4, 7, . . . , and 34) corresponds to the first phase, while the sequence (2, 5, 8, . . . , and 35) corresponds to the second phase.

Rotating magnetic fields are generated by flowing current of appropriate phase through wire coils placed in the slots. By design the wire coils may have different winding patterns (e.g., serial or parallel) around the stator poles.

Figure 2:
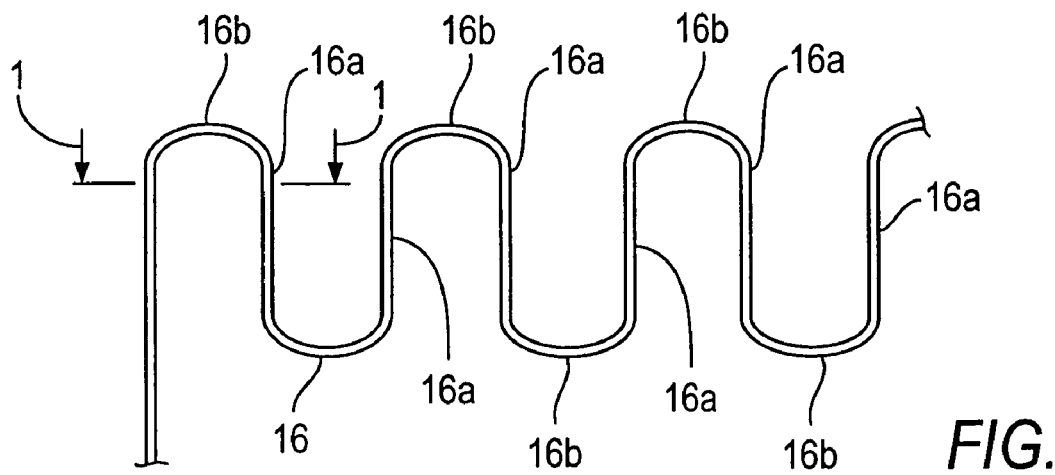
FIG. 2 is an illustrative planar projection of portions of one of the wave wound conductor coils of FIG. 1 exemplifying its wave configuration. (The partial plan view of FIG. 1 corresponds, for example, to a view from direction 1-1 or from other similar directions in FIG. 2)

In stator 10 described herein, for purposes of illustration, each wire coil corresponding to a current phase is wound or connected in series in a "wave configuration" (see e.g., FIG. 2) with longitudinal wire portions (e.g., portions 16a and 17a) running in the slots of the sequence associated with the current phase. Horizontal wire segments or lengths (e.g., 16b and 17b) electrically connect in series the longitudinal wire lengths placed in the slots. These horizontal wire lengths are placed along the top or bottom axial faces of stator 10. With the use of this wave winding configuration, each of the three current phases corresponds to a single wire coil around the stator. Thus, three-phase stator 10 has three wire coils.

In conventional stators each of the stator wire coils may include several wire turns or filaments depending on the wire size used. Conventional manufacturing methods and apparatus for assembly of stators having a wave configuration of wire coils are disclosed, for example, in Barrera U.S. Pat. No. 4,512,376, and in Cardini et al. U.S. Pat. No. 5,845,392. It will, however, be understood that the invention disclosed herein is not limited to stators with wave wound coils, but is also applicable to other types of dynamo-electric machine components and to other types of winding configurations or patterns.

In inventive stator 10, one or more thick bar conductors are used to make the stator wire coils. The use of thick bar conductors may avoid the limitations associated with the conventional use of small size wires to make the stator coils. For example, the use of thick bar conductors may simplify wire coil manufacture by reducing the number of wire turns required to fabricate a wire coil with a desired current-carrying capacity. Also, the use of thick bar conductors may advantageously increase the conducting fill of the stator slots. High conducting fills may improve stator performance characteristics, and allow the construction of more compact stators than may be possible using coils made with smaller wire size. Compact stators may be preferred, for example, for automobile alternators.

With reference to the exemplary three-phase stator 10 shown in FIG. 1, the first phase coil may be made from two thick bar conductors 16 and 17 that have diameters comparable to the width (W) of stator slot passages P. FIG. 1 shows longitudinal conductor portions 16a and 17a of the first phase coil that are respectively designated for placement in slots 11 and 14. Similar longitudinal conductor portions are designated for placement in other slots around the stator that are associated with the first current phase (not shown). FIG. 1 also shows phantom representations of conductor lengths 16b and 17*b*. These conductor lengths connect longitudinal conductor portions 16*a* and 17*a* to provide electrical continuity to the first phase coil around the stator. Conductor lengths 16*b* and 17*b* are designated to run across the top axial face 10' of stator 10. Similar conductor lengths that lead to conductor portions 16*a* and 17*a* from adjoining (first phase) slots are designated to run across the bottom axial face (not shown). Also for clarity in FIG. 1, conductors of the second and the third phase coils, which are respectively designated for placement in slots 12 and 13 are not shown.

Stator 10 poles are suitably designed to accommodate insertion of the thick bar conductors in the stator slots. For example, stator 10 poles are designed to increase the width (W) of the openings leading to slot passages P. To accomplish this the conventionally used cap-like pole expansion portions or shoes are omitted or reduced from the laminate casing that is used in stator 10. FIG. 1 shows, for example, stator 10 poles with reduced expansion portions (corners C). With the reduced or omitted pole expansion portions, the slot opening widths W are about the same as the general widths of slot passages P over their entire depths. These unconventionally enlarged slot opening widths W allow unrestricted insertion of coil wires of all sizes, including thick bar conductors into the stator slots.

Figure 6:
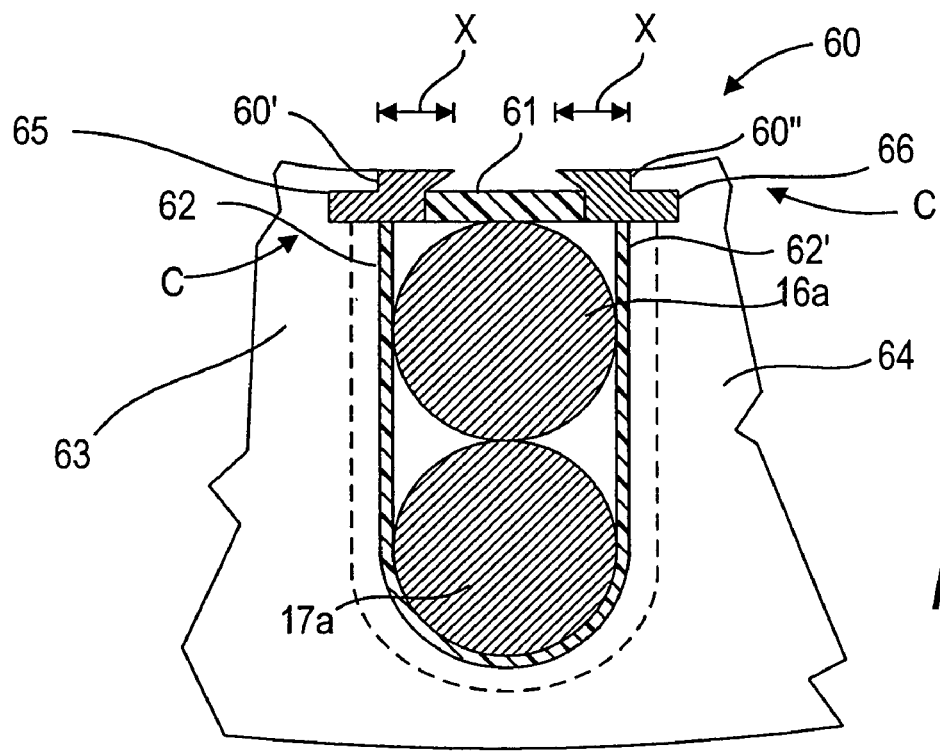
FIGS. 6 and 7 respectively show different slot cover assemblies that can be placed over the stator slot openings to cover the inserted wire conductors, in accordance with the principles of this invention.

The longitudinal slots in stator 10 are shown as having a U-shape with approximately parallel pole sides (e.g., FIG. 6 sides 62 and 62'). It will be understood that the specific shape is chosen only for purposes of illustration herein. Other suitable shapes including those having variously tapered or curved sides may be used as appropriate or desired, for example, for specific pole designs or characteristics. Insulation inserts 15 line the walls of slot passages P to electrically isolate the conductors inserted in the stator slots. Inserts 15 may be made, for example, from plastic sheeting. Inserts 15 may be provided with axial end flanges or shoulder enlargements 15' (shown in phantom representation). Shoulders 15' abut or press against stator 10 end faces (e.g., 10') to prevent movement of inserts 15 parallel to stator axis O. Alternatively or additionally, pins 40 may be used to temporarily tack or hold inserts 15 in position in the stator slots. Pins 40 are removed prior to insertion of conductors (e.g., conductors 16*a* or 17*a*) in the stator slots. To facilitate this, suitable pin holding and withdrawing structures may be conveniently disposed adjacent to one or both ends of stator 10 in the stator assembly processes (not shown).

The assembly processes for making stator 10, may involve the use of a coil-form or mandrel 20. The stator wire coils are first formed on mandrel 20 in a wave configuration, and then transferred into stator 10. Mandrel 20 has seats 21 with radial passages P1 that are open toward the outer surface of mandrel 20. Mandrel 20 fits in the bore of stator 10 such that radial passages P1 can be aligned with slot passages P.

Seats 21 are designed to receive longitudinal conductor portions of the wire coil (e.g., portions 16*a* and 17*a*). The axial ends of mandrel 20 are designed to receive conductor lengths (e.g., lengths 16*b* and 17*b*), which connect the longitudinal portions of the wire coil. Mandrel 20 includes suitable mechanisms to transfer out wire coils formed on it. For example, mandrel 20 may include pressers 22 that move in radial direction R to push out longitudinal conductor portions of the wire coil placed or formed in seats 21.

Figure 3:
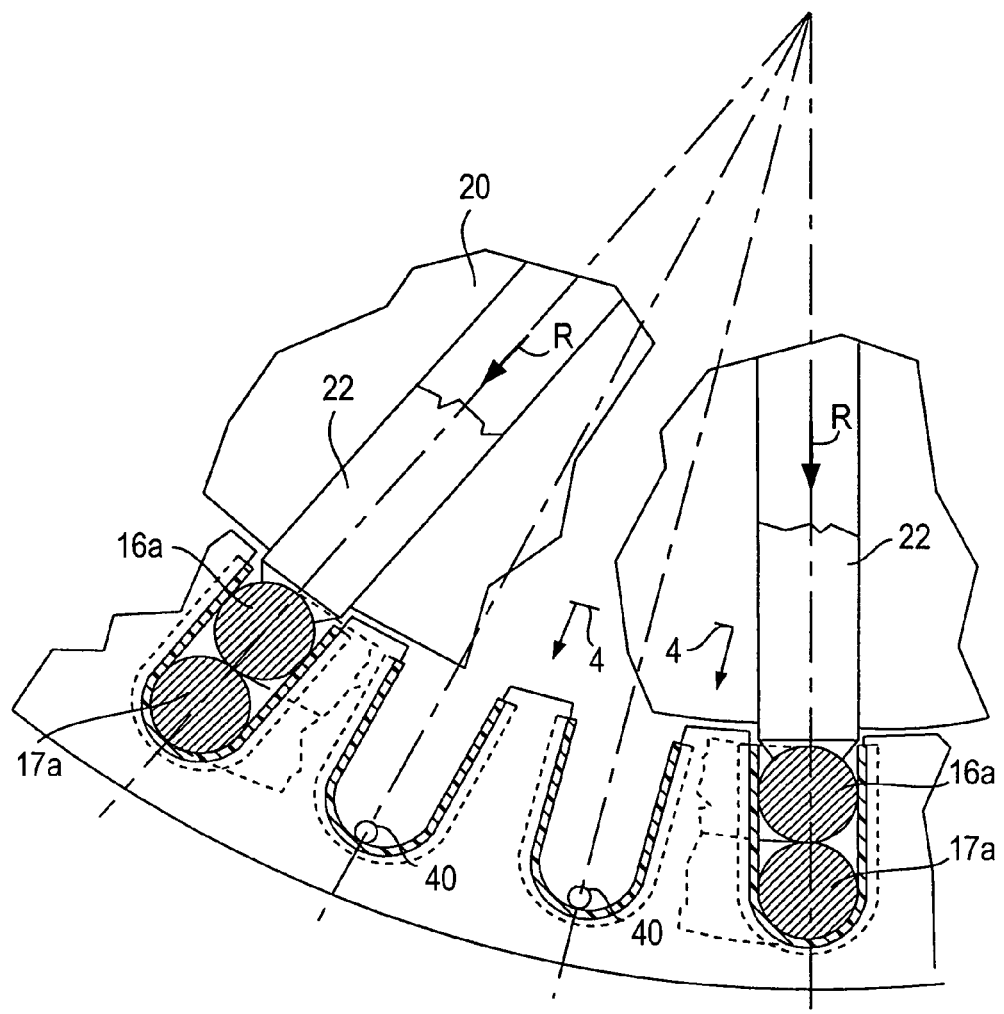
FIG. 3 is a view similar to that of FIG. 1, showing the longitudinal conductor portions of a wire coil placed in the stator slots, in accordance with the principles of this invention.

In practice, a wire coil is first formed on mandrel 20 while mandrel 20 is outside the bore of stator 10 and the mandrel surfaces are readily accessible. Then mandrel 20 is inserted in the bore of stator 10 (as shown in FIG. 1) so that radial passages P1 are aligned with stator slot passages P. Next, pressers 22 are operated to push longitudinal conductor portions (e.g., 16*a* and 17*a*) radially out of seats 21 into the aligned stator slot passages P. This push transfer of the longitudinal conductor portions in radial direction R also moves the connecting conductor lengths (e.g., lengths 16*b* and 17*b*) from the axial ends of mandrel 20 onto the axial ends of stator 10. FIG. 3 shows, for example, a wire coil that has been transferred from mandrel 20 into stator 10.

In alternative stator assembly processes, wave wound wire coils can be formed in stator 10 by dispensing conductors directly into or along stator slot passages P. A delivery nozzle may be used to deliver or dispense the conductors. Suitable conventional drive mechanisms (not shown) may be used to provide the nozzle and/or stator 10 with the capability to move relative to each other. The drive mechanisms may allow relative motion, sequentially or simultaneously, in one or more dimensions. FIGS. 4 and 5 show, for example, a movable delivery nozzle 30 that can be used to dispense a conductor (e.g., conductor 16 or 17) along the stator slot passages P. Nozzle 30 operates through the bore and around stator 10.

FIGS. 4 and 5 exemplify the linear movements of nozzle 30. FIG. 4 shows nozzle 30 at position PO1 after it has moved in upward direction 32 to dispense a stretch of longitudinal conductor portion 16*a* along or parallel to slot 11. Further movement of nozzle 30 in radial direction 33 to position PO2 (FIG. 5) pulls or inserts the dispensed stretch of longitudinal conductor portion 16*a* into slot 11.

FIG. 5 also exemplifies the subsequent circular movement of nozzle 30 in an arc 35 along the axial face of stator 10 to deposit the conductor lengths (e.g., lengths 16*b*) that lead to the next longitudinal portion 16*a* of the wire coil (slot 14). Alternatively, nozzle 30 may be kept stationary as it dispenses the conductor lengths while stator 10 is rotated or indexed to the next slot.

Optional guide forms may be employed to assist in mechanically shaping or bending the conductor lengths dispensed by nozzle 30. FIGS. 4 and 5 show, for example, guide forms 36 that are aligned with the end faces of stator 10. Guide forms 36 are suitably shaped to assist in bending the dispensed conductor so that conductor lengths (e.g., lengths 16*b*) stay close to the stator axial faces. The circular motion of nozzle 30 along arc 35 extends from position PO2 to a radially inward position PO3 above slot 14 in preparation for dispensing the next stretch of longitudinal conductor portion 16*a*.

It will be readily understood that nozzle 30 can be used to insert a complete wave wound coil 16 in stator 10 by using suitable combinations of nozzle movements relative to stator 10 that are similar to those described above. For example, as a next step nozzle 30 can move downward from position PO3 (in a manner similar but opposite to its upward movement in direction 32) to dispense the next stretch of longitudinal conductor portion 16*a* for insertion in slot 14.

In addition to dispensing conductor 16, nozzle 30 may also be used to dispense conductor 17 or any other number of different conductors that may be used to form the stator wire coils. Alternatively, separate or additional nozzles that are similar to nozzle 30 may be used to dispense conductor 17. The nozzles (e.g., nozzle 30) may be rotatably mounted on arms or structures that allow continuous adjustment of the nozzle orientation. During the winding or dispensing of the wire coils, the nozzle orientation may be advantageously adjusted as needed so that at all times the dispensed conductor is ejected straight along the nozzle axis.

After wire coil conductors (e.g., conductors 16 and 17) have been inserted in stator 10 either by transfer from mandrel 20 or by injection using nozzle 30, suitable covers may be placed over the stator slots to mechanically retain the wire coil conductors in position. The covers may include suitable ferromagnetic material sections that enhance passage of magnetic flux through the poles of stator 10.

FIG. 6 shows an exemplary slot cover 60 covering the stator slot between adjacent poles 63 and 64. Cover 60 is shaped so that it can be installed along the length of the stator slot and held against respective pole sides 62 and 62'. Stator 10 poles also may be designed to include optional seats running along the lengths of the poles to receive and hold cover 60 by its ends. FIG. 6 shows, for example, seats 65 and 66 running just below the edges or corners C of poles 63 and 64.

Cover 60 includes an insulating portion 61 with lateral extensions or portions 60' and 60", which may be made of suitable ferromagnetic material. When installed ferromagnetic lateral portions 60' and 60" provide additional magnetic conducting paths to increase the passage of magnetic flux through poles 63 and 64. Lateral portions 60' and 60" may have widths X and other dimensions or shapes that are designed to replicate or otherwise function as the conventional pole shoe extensions that are omitted in stator 10 design to accommodate insertion of the thick bar conductors in the stator slots.

Figure 8:
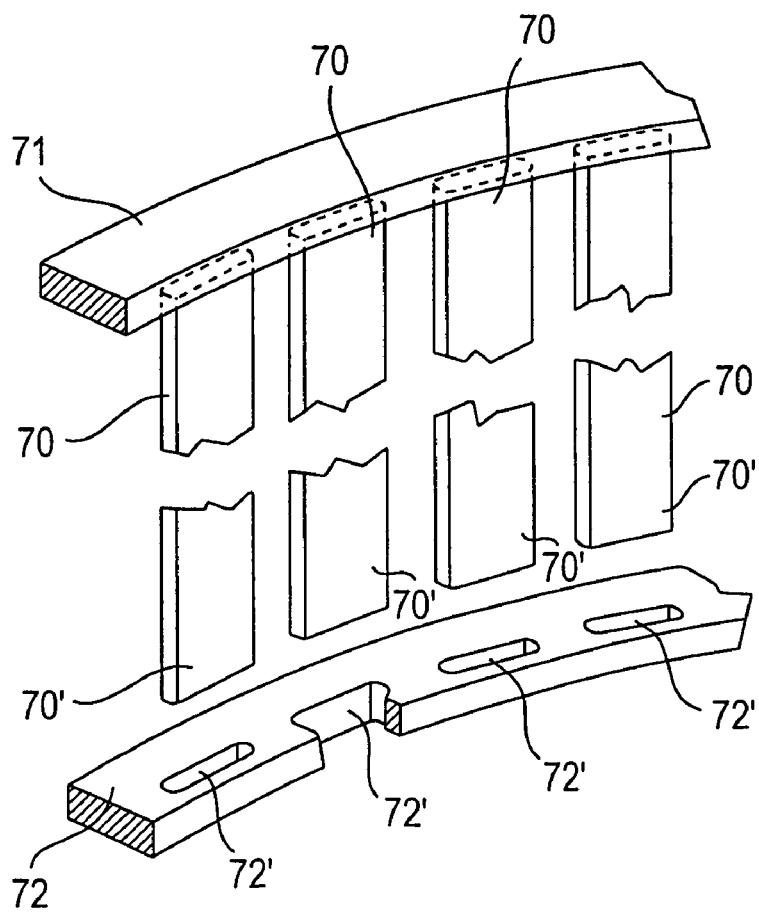
FIG. 8 is a perspective view of the slot cover assembly of FIG. 7, in accordance with the principles of this invention.
Figure 7:
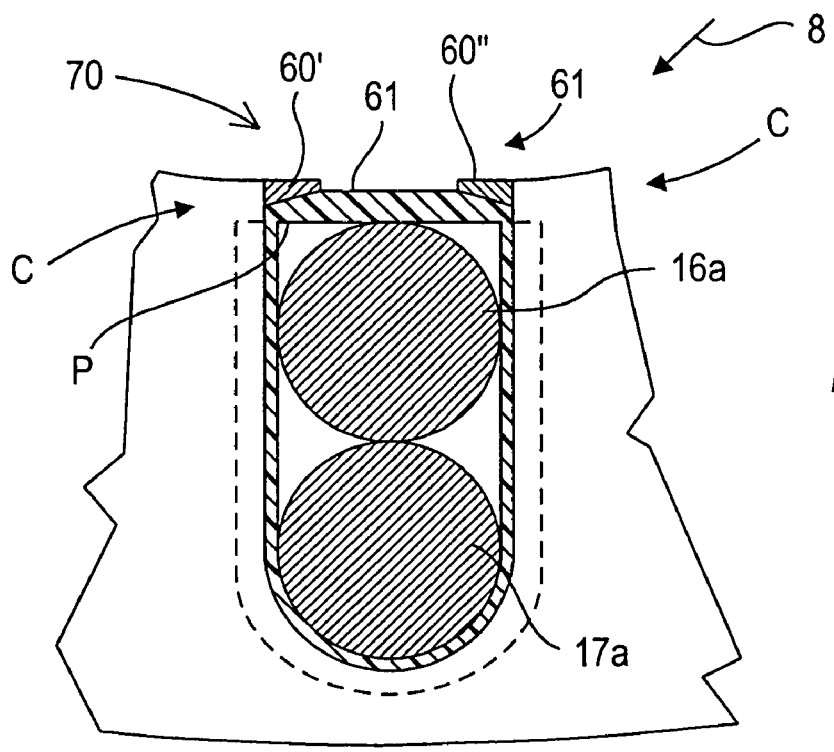

In the stator assembly processes, slot covers 60 are installed by running the appendixes or edges of lateral portion 60' and 60" lengthwise through seats 65 and 66, until central portion 61 fully covers slot passage P. FIGS. 7 and 8 show an alternative slot cover arrangement that avoids the use or need for pole seats (such as seats 65 and 66) to hold slot covers in position.

Slot covers 70, like covers 60, include insulating central portions 61 with ferromagnetic lateral extensions 60' and 60". Covers 70 are designed to lie over the stator slots between or abutting the edges or corners C of the adjoining stator poles. Covers 70 that are installed over the stator slots may be fixed in position by mechanically holding the longitudinal ends of covers 70. One or more rings that can be secured to the axial faces of stator 10 may, for example, be used to hold the ends of covers 70. FIG. 8 shows an exemplary arrangement of a pair of annular rings 71 and 72 that may be used for this purpose. In this arrangement, covers 70 extend as downward slats from upper annular ring 71. Lower annular ring 72 includes seats 72' that are designed to receive and hold longitudinal ends or feet 70' of the downward slats. Seats 72' and feet 70' may be mutually shaped, for example, as conventional tongue and groove joints, for mechanical rigidity of the slot cover arrangement.

In the stator assembly processes, slot covers 70 are installed, for example, by placing lower annular ring 72 on an axial face of stator 10 with seats 72' aligned with stator slot passages P. Annular ring 71 is lowered over the opposing axial face such that covers 70 are inserted into the stator bore in alignment with the stator slot passages P and toward annular ring 72. Covers 70 are advanced sufficiently through the bore of stator 10 to allow cover feet 70' to extend into seats 72' of annular ring 72. Annular rings 71 and 72 are then secured to the respective axial faces of stator 10 to hold covers 70 in fixed positions.

Figure 9:
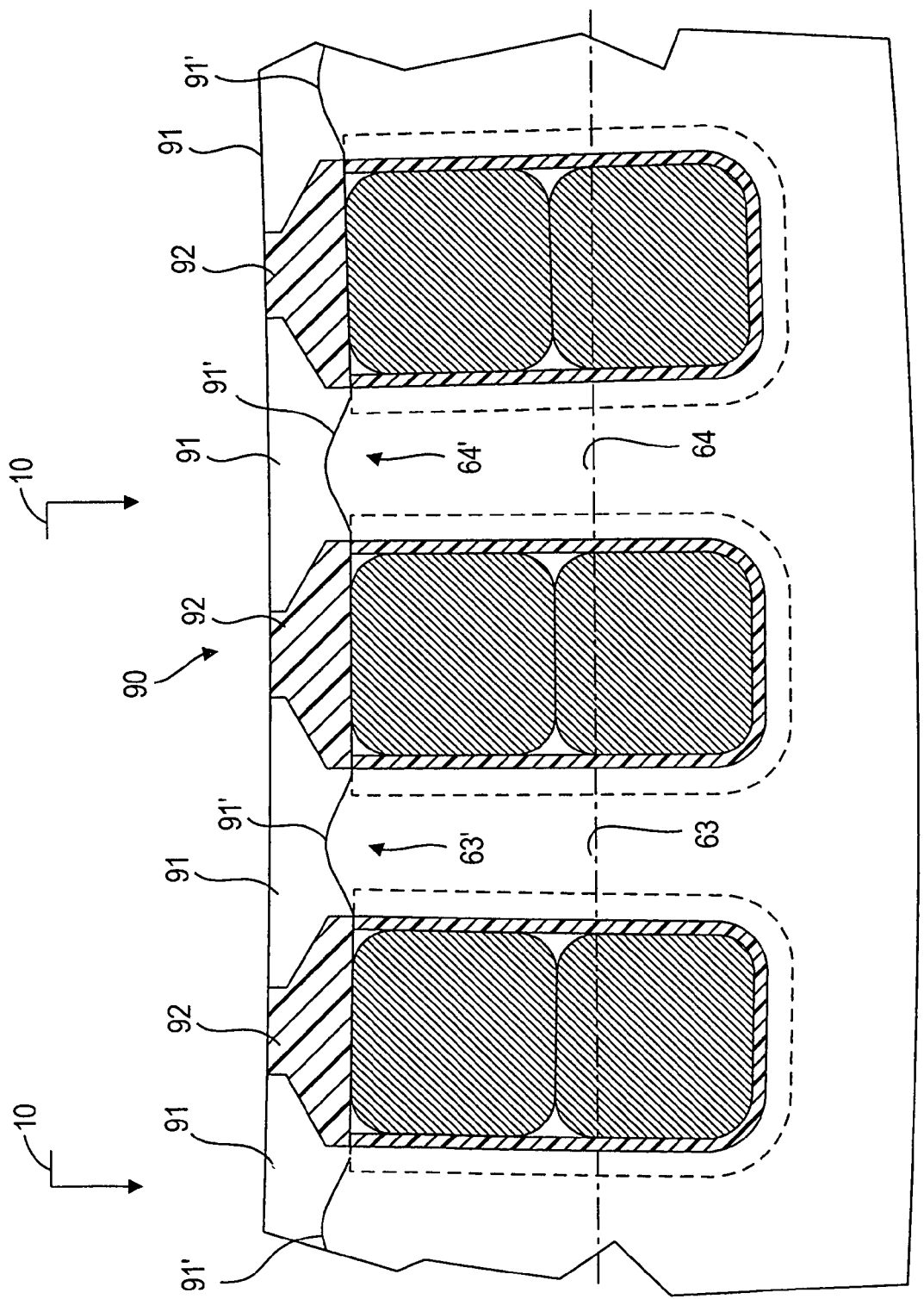
FIGS. 9 and 10 show another slot cover assembly, in accordance with the principles of this invention.
Figure 10:
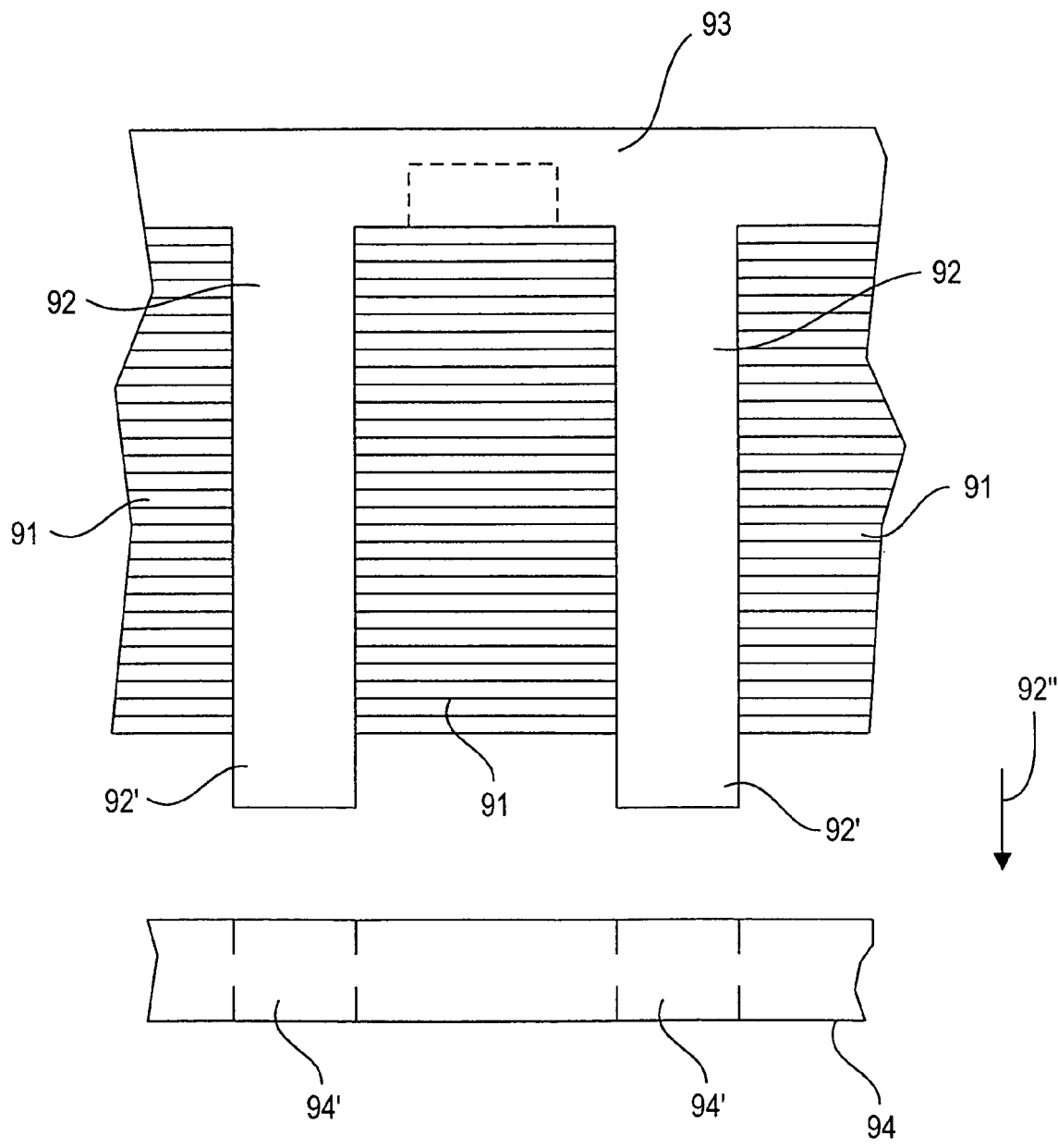
Figure 11:
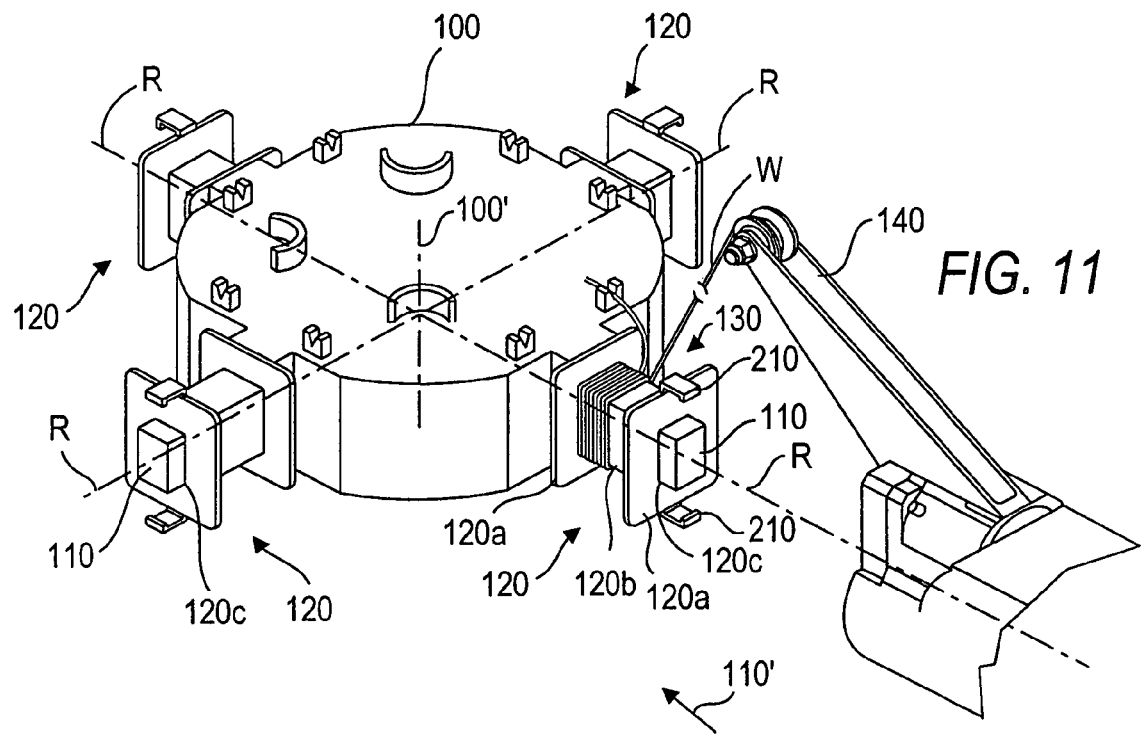
FIG. 11 is a perspective view of a mandrel and flyer arm arrangement which is used for pre-forming wire coils in moveable pockets, in accordance with the principles of this invention.

Another slot cover arrangement, which may be used with suitably modified stator 10 structures, is shown in FIGS. 9 and 10. In this arrangement, a cylindrical sheet 90 is used to cover the entire inner surface of the bore of stator 10. Cylindrical sheet 90 is made of alternating longitudinal sections that may be similar to annular ring 71. These alternating sections include metal sections 91 that serve as pole expansions or shoes, and insulating sections 92 that function as slot covers. Insulating sections 92 may extend away from annular ring 93 to section ends or feet 92'. Feet 92' are designed for receipt and holding in seats 94' of a lower annular ring 94 that may be similar to annular ring 72 (FIG. 8).

Metal sections 91 can be made from suitable ferromagnetic material in the form of a solid body. Alternatively, metal sections 91 may be made as a laminate. For example, metal sections 91 may be fabricated by stacking lamination sheets, one on top of the other. Conventional joining techniques may then be used to join the stack and form the laminate. Insulating sections 92 may be made from common insulation material (e.g., plastic material). Annular ring 93 also may be made of suitable plastic materials. Conventional plastic injection molding techniques may be used to fabricate insulating section 92 and annular ring 93 portions of cylinder sheet 90. These techniques may also be convenient for embedding metal sections 91 in cylinder sheet 90 between alternating insulating sections 92.

In the deployment of cylindrical sheet 90, upper annular ring 93 is suspended or held over an axial face of stator 10 so that insulating sections 92 and metal sections 91 extend downward in longitudinal direction 92". Cylindrical sheet 90 is lowered into the bore of stator 10 so that insulating sections 92 are aligned with slot passages P and the metal sections 91 are in contact with top surfaces of the stator poles (e.g., poles 63 and 64). For mechanical stability of deployed cylindrical sheet 90, ends or feet 92' of insulating sections 91 extending away from annular ring 93 may be mechanically supported at the opposing axial face of stator 10. Lower annular ring 94 with seats 94', which are designed to receive and hold feet 92', may be used for this purpose in a manner similar to that described above for slot covers 70 with reference to FIGS. 7 and 8. Annular rings 93 and 94 may be secured to the axial faces of stator 10 to mechanically fix the positions of insulating sections 92 over the stator slot passages P.

For increased mechanical rigidity or stability of deployed sheet 90, the upper and lower ends of laminated metal sections 91 also may be point welded to the axial ends of the stator 10. Additionally, the mutually contacting surfaces of metals sections 91 and stator poles may be designed to enhance the mechanical rigidity of deployed sheet 90. For example, metal sections 91 may be provided with bottom curved contact surfaces 91', and the design of stator 10 may be suitably modified so that top surfaces (e.g., surfaces 63' and 64') of stator poles have curved shapes conforming to curved surfaces 91'. The conforming curvature of these surfaces allows good mechanical contact between the poles and metal sections 91, and yet restricts undesirable sliding movement of metal sections 91.

This contact arrangement also provides electro-magnetic conducting paths for the flow of magnetic flux from the stator poles into the metal 91. Metal sections 91 may be suitably shaped to enhance or optimize the flow of magnetic flux into the stator bore. Suitably shaped metal sections 91 may, for example, as shown in FIG. 9, have the shape of conventional pole expansions or shoes.

In some stator designs, installation of slot covers to restrain wire coil conductors may not be suitable or required, or may be optional. Accordingly, the slot covers above can be suitably modified. The suitable modification may, for example, eliminate or limit the insulating sections (e.g., 61 or 91) and include only the pole extension sections (e.g., 60' and 60", or 92). Thus in some applications, the slot covers may be designed to function primarily as pole extensions that can be attached to poles after insertion or formation of the wire coils around them. Conversely, for some other applications the slot covers may be designed to function primarily as insulating covers limiting or eliminating the pole extension function.

The wide-mouth slot designs and the later-attachable pole extensions of the present invention (with or without insulating sections) provide greater design flexibility in dynamoelectric machine manufacture. The wide mouth slot designs may advantageously be used in other stator designs that, for example, call for parallel coils or small diameter wire coils (unlike the wave wound thick conductor coils of stator 10). The wide- or open-mouth slot design allows insertion of wire turns into all regions or portions of the slot volume without geometrical interference from the pole extensions. Thus higher slot conductivities can be achieved.

FIGS. 11-14 illustrate the beneficial use of open-mouth slot designs in making stators (e.g., stator 170) with parallel coil configurations (i.e., in which individual coils are wound around individual poles). The individual coils may, for example, be pre-formed on a mandrel and then transferred or inserted radially into the slot passages before pole extensions are attached to the poles.

Exemplary mandrel 100 may be used to pre-form wire coils supported on pockets 120 for insertion or transfer into stator 170. Mandrel 100 has a number of radial structures or extensions 110 on which hollow coil support pockets 120 are slidably mounted. Pockets 120 are designed to fit on both extensions 110 and on poles 20 of stator 170. Pockets 120 have trunk portions 120*b* between a pair of flanges 120*a*. Central hollows or passages 120*c* pass through pockets 120.

When pockets 120 are supported on mandrel 100, lengths of extensions 110 extending from shoulders 110" pass through central passages 120*c* of pockets 120. The sliding position of pockets 120 on structures 110 may be limited at one end by flanges 120*a* acting against shoulders 110". Suitable mechanical catches (e.g., similar to catches 210) may be used to secure pockets 120 in position.

When pockets 120 are supported on stator 170, poles 20 pass through the central hollows 120*c*. Flanges 120*a* at the top end of poles 20 may be designed and made of suitable ferromagnetic material to serve as pole extensions. Flanges 120*a* at the top end include catches 210 that are designed to engage matching recesses on stator end board 170' to hold pockets 120 in position when they are fitted on poles 20.

The number of pockets 120 may correspond to the number of wire coils (or poles) corresponding to a specific phase in stator 170. Mandrel 100 is designed so that the radial axes R through structures 110/pockets 120 can be with aligned with stator radii through poles 20.

Individual wire coils 130 may be wound turn by turn, and layer by layer, on trunk portions 120*b* using, for example, a conventional flyer arm 140. Flyer 140 can rotate around axis R through a subject pocket 120 to deposit or pull wire turns W1 around trunk portions 120*b*. Flyer 140 may translate along axis R to stratify wire turns W1. Flanges 120*a* act as barriers, which limit the spread of wire turns W1 and coil layers along trunk portions 120*b*, and thus define the edges of the wound coils.

Mandrel 100 may be indexed relative to flyer arm 140 to present pockets 120 in sequence for wire coil winding. Wire coils may be wound by flyer arm 140 successively on all pockets 120. In alternative wire coil winding arrangements, more than one flyer arm like flyer arm 140 may be used to simultaneously wind wire coils around more than one of pockets 120. In a modified mandrel 100, pockets 120 may be rotatable. Such rotatable pockets (120) may be rotated using suitable conventional drive mechanisms. Pockets 120 may be rotated to draw wire turns around themselves. For wire coil winding on such a modified mandrel 100, a wire dispenser that can translate along axis R may be used to stratify the wire turns drawn by rotating pocket 120.

In assembly line machines, the wire winding configurations (e.g., number of winding stations or mandrels used, the number of extensions 110/pockets 120 on mandrel 100, and the number of flyer arms used) may be limited in some instances with consideration to stator size, and requirements of tool clearance and free operating space. In an exemplary assembly line for manufacturing three-phase stators, three separate workstations may be used to concurrently process the individual coil sets corresponding to each of the three current phases. In this case, each workstation includes one mandrel. The number of extensions 110 provided on each mandrel 100 may be limited and equal the number of poles corresponding to single phase (e.g., 4 for the 12-pole stator 170 shown in FIG. 12). Limiting the number of extensions in this manner on the mandrels may provide adequate clearance for conventional tool (e.g., flyer arm) operation.

In each workstation after a wire coil has been wound around an individual pocket (120), wire coil leads 150 and 160 may be temporarily anchored to tabs or anchor posts on the body or the axial faces of mandrel 100, or optionally on flange 120*a*. Conventional lead manipulators may be used to manipulate leads 150 and 160 for this purpose (not shown). The lead manipulators used may be similar to those shown, for example, in co-assigned and co-owned Luciani et al. U.S. Pat. No. 5,065,503. Such or other lead manipulators may be used to attach initial and final leads 150, and also uninterrupted leads 160 that connect the individual wire coils in a sequence associated with a single current phase.

Figure 12:
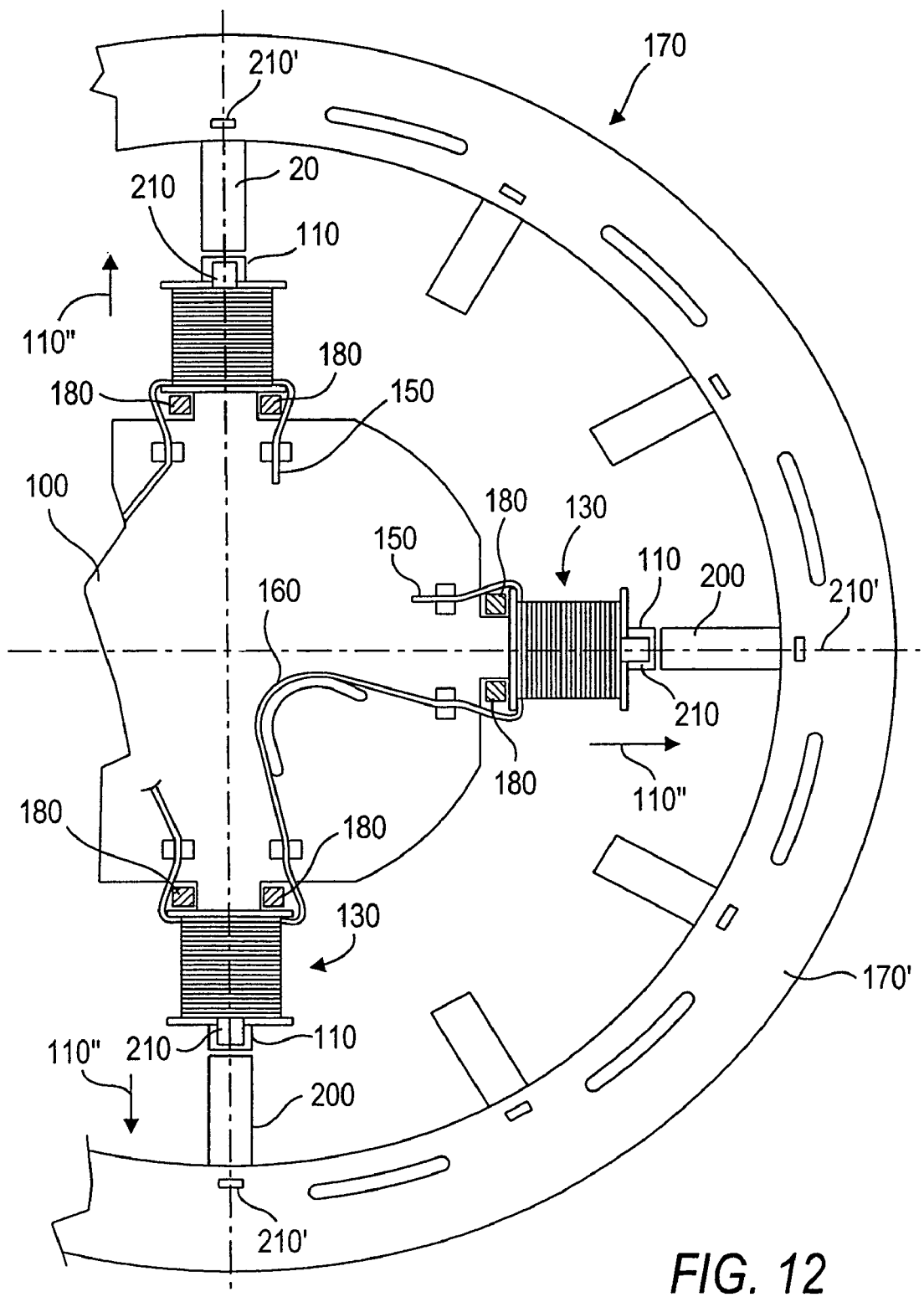
FIG. 12 is a planar partial view of the mandrel and flyer arm arrangement of FIG. 11.

After all of the desired individual wire coils corresponding to single current phase have been pre-formed on mandrel 100 (See e.g., FIG. 12) they may be transferred onto stator poles 20 of stator 170. To initiate this transfer, mandrel 100 is inserted in the bore of stator 170. Pockets 120/extensions 110 are radially aligned with poles 20 as shown in FIG. 12. Next, pockets 120 are slid in direction 110" from extensions 110 on to aligned poles 20. Suitable mechanisms may be used to slide pockets 120 from extensions 110 onto aligned poles 20. For example, moveable forks 180 may be used to engage and push flanges 120*a* in directions 110" so that pockets 120 slide onto poles 20. Pockets 120 bearing the wire coils can slide on to poles 20 smoothly, for example, without geometrical interference from conventional pole extensions or other structures. Suitable pole extensions may be attached later if desired.

Figure 13:
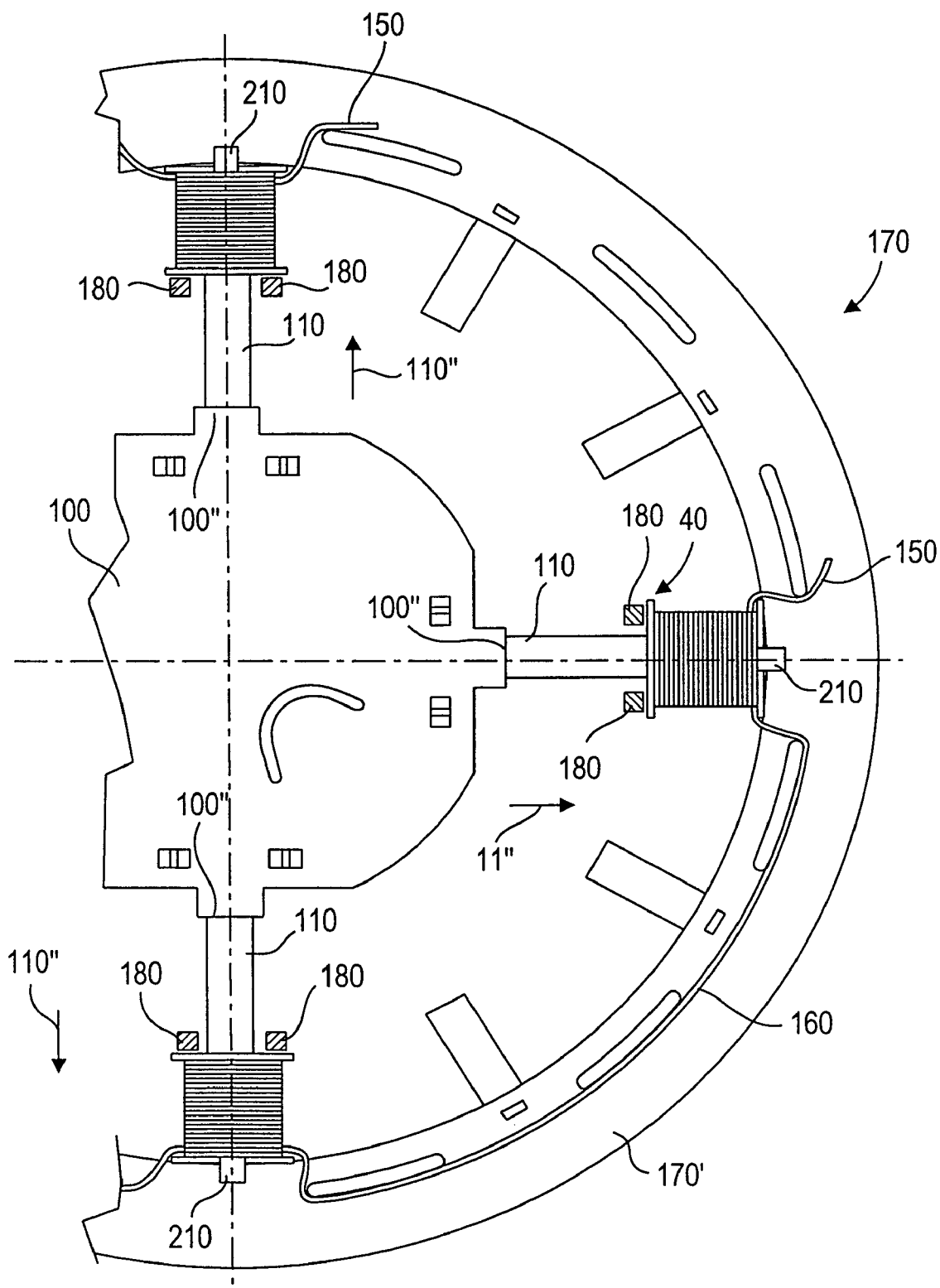
FIG. 13 shows the moving pockets of FIG. 12 installed on the stator poles in accordance with the principles of this invention.

FIG. 13 shows, for example, pockets 120 that have been transferred onto poles 20. Mechanical catches 210 engage the matching recesses 210' to secure pockets 120 in position over poles 20. FIG. 13 also shows leads 150 and 160 that have been repositioned from their temporary positions to stator end board 170' using suitable lead manipulators (e.g., the previously mentioned conventional lead manipulators). After installation of pockets 120 or a set of poles 20 corresponding to a single current phase, stator 170 may be transferred to the next workstation for installation of pockets 120 on the next set of poles.

Wire coils having high slot fill densities can be transferred on to poles 20. After the wire coils have been positioned, suitable pole extensions (e.g., metal sections 92) may optionally be attached to poles 20.

Figure 14:
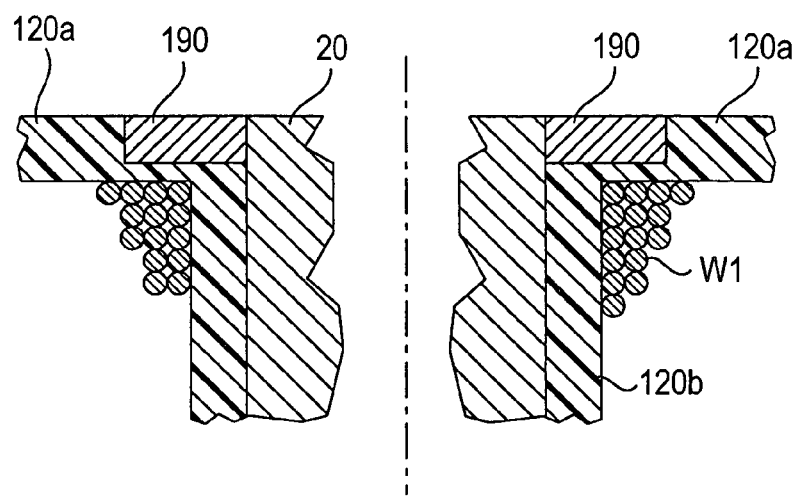
FIG. 14 is an enlarged cross sectional view of area 40 of FIG. 13 illustrating the abutment of pole extensions to the pole, and for clarity only, a few of the of the wire turns in the corner region.

As a result of applying the principles of the invention, the space of the stator slots can be filled with wire turns W1 of coils 130 more completely or fully avoiding for example, the geometrical dead spaces in the leeward shadows of pole extensions found in conventional stators. FIG. 14 shows an enlarged view of area 40 of FIG. 13 illustrating the fill of wire turns W1 in the corners of the pocket 120 adjoining pole 20. FIG. 14 also shows optional ferromagnetic inserts 190. Inserts 190, are placed in seats or built into flange 120*a* that may be made from insulating plastics. Inserts 190 abut the top ends of poles 20 and may be designed to function as pole extensions to enhance and distribute magnetic flux through poles 20.

It will be understood that the foregoing is only illustrative of the principles of the invention, and that various modifications can be made by those skilled in the art without departing from the scope and spirit of the invention. It will be understood that terms like "upper" and "lower", "front" and "rear", "upward" and "downward", and any other terms relating to direction or orientation are used herein only for convenience, and that no fixed or absolute orientations are intended by the use of these terms.

The invention claimed is:

1. A method for the assembly of a dynamo-electric machine component, comprising:
    providing a casing having a set of poles;
    using a mandrel having a number of radial extensions for supporting moveable pockets, wherein each extension supports one of the movable pockets and wherein the extensions are geometrically alignable with the poles such that the moveable pockets are transferable from the radial extensions to the casing poles;
    pre-forming wire coils on the moveable pockets while they are being supported by the mandrel; and
    attaching the moveable pockets to the casing so that the pre-formed wire coils are placed around the poles.

2. The method of claim 1 wherein providing a casing further comprises providing mechanical catches to attach the moveable pockets to the casing, and wherein attaching the moveable pockets to the casing comprises:
    transferring the moveable pockets from the extensions to the poles; and
    using the mechanical catches to secure the position of the moveable pockets transferred to the poles.

3. The method of claim 1 wherein the dynamo-electric machine component is a component operable by flowing poly-phase current through the wire coils placed around the poles, wherein each current phase is associated with a subset of the poles, and wherein the number of extensions on the mandrel for supporting the moveable pockets corresponds to the number of poles in the subset associated with a specific current phase.

4. The method of claim 3 further comprising transferring the moveable pockets with pre-formed wire coils to the poles in the subset associated with a specific phase.

5. The method of claim 1 further comprising using a plurality of the mandrels, wherein each mandrel is disposed at a workstation, and wherein at each workstation wire coils are placed around a fraction of the set of casing poles.

6. The method of claim 1 further comprising temporarily anchoring leads connecting the pre-formed coils on the mandrel; and
    repositioning the leads when transferring the moveable pockets with the pre-formed wire coils on to the aligned casing poles.

7. The method of claim 1 wherein each of the number of radial extensions is configured to receive only one moveable pocket at a time.

* * * * *